UNITED STATES PATENT OFFICE.

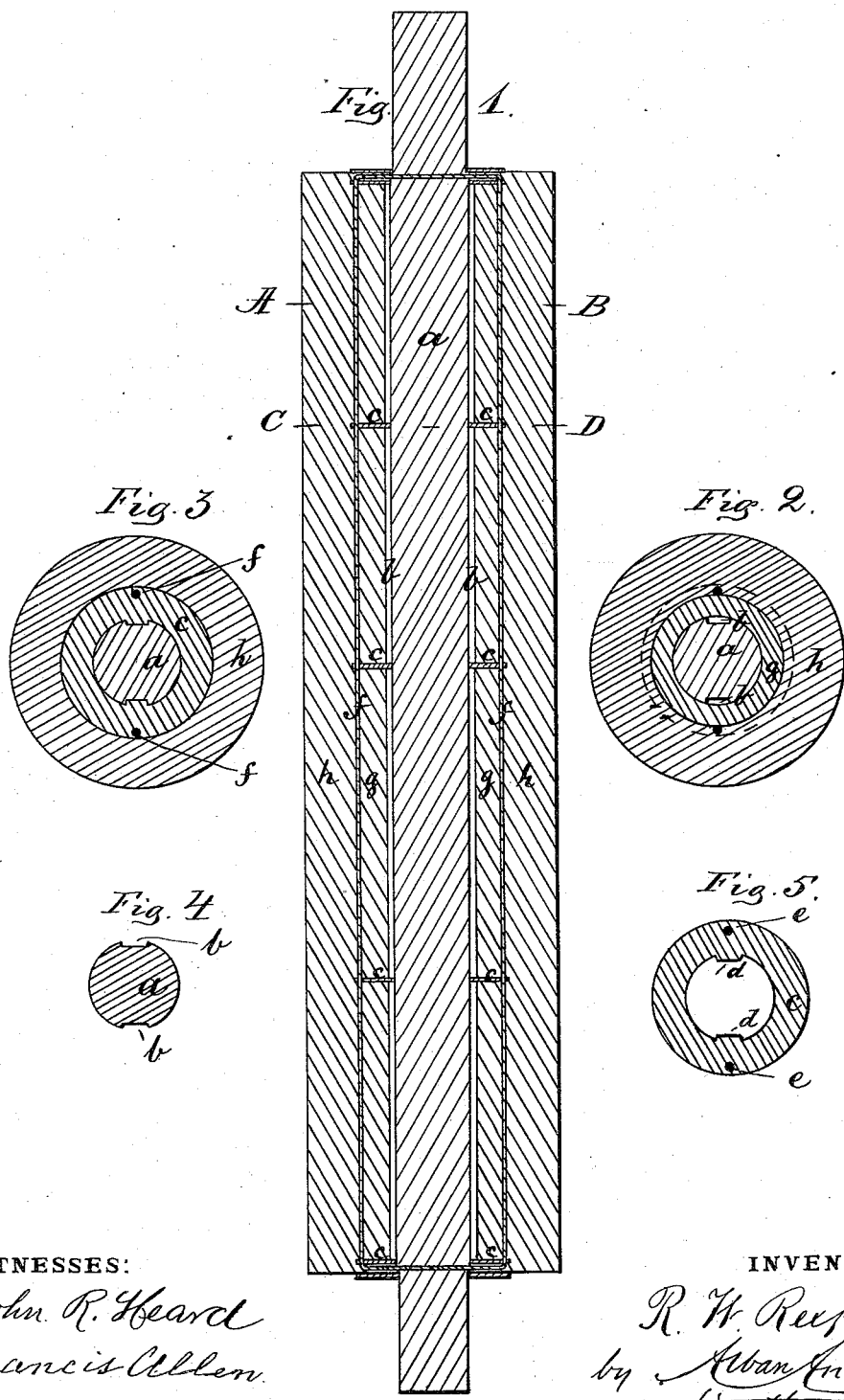

RICHARD W. REXFORD, OF BOSTON, MASSACHUSETTS.

IMPROVEMENT IN WRINGER-ROLLS.

Specification forming part of Letters Patent No. 163,107, dated May 11, 1875; application filed April 8, 1875.

*To all whom it may concern:*

Be it known that I, RICHARD W. REXFORD, of Boston, in the county of Suffolk and State of Massachusetts, have invented certain new and useful Improvements in Wringer-Rolls; and I do hereby declare the following to be a full, clear, and exact description of the invention, such as will enable others skilled in the art to which it pertains to make and use it, reference being had to the accompanying drawings, which form part of this specification:

My invention relates to improvements in wringer-rolls; and consists in the employment of a central shaft provided with longitudinal grooves, in combination with metallic washers, having lips on their insides fitting into the grooves on the shaft, and perforated near their edges, through which perforation metallic wires are inserted and fastened to the shaft in each of its ends, by which arrangement the rubber that is used on the roll is firmly secured from one end to the other of the shaft, and is as firmly secured midway between the ends of the roll as in each end.

The rubber is laid on as follows: A sleeve or sheet of rubber, of a tough and strong nature, is placed around the shaft between each washer, after which the wires are inserted through the perforations in the washers and secured in each end to the shaft. An outer layer of rubber is then laid around the first-named central rubber, and the whole is then vulcanized in the usual manner.

It will thus be seen that the rubber is held in place by the longitudinal wires passing through it and the washers, the latter being secured to the shaft by means of the lips fitting in the longitudinal grooves on the shaft.

One of the said washers is located midway between the ends of the shaft, where the greatest strain comes during the use of wringer-rolls.

On the accompanying drawing, Figure 1 represents a central longitudinal section of my improved wringer-roll. Fig. 2 represents a cross-section on the line A B, and Fig. 3 represents a similar cross-section on the line C D. (Shown in Fig. 1.) Fig. 4 is a cross-section of the shaft, and Fig. 5 is a longitudinal section of one of the washers.

Similar letters refer to similar parts wherever they occur on the different parts of the drawings.

$a$ represents the shaft provided on two or more sides with parallel grooves $b\ b$, as shown. $c\ c$ represent metallic washers fitting closely onto the shaft $a$, and having lips or projections $d\ d$ on the inside to fit closely into the grooves $b\ b$ on the shaft $a$. The said washers are also provided with perforations $e\ e$, through which the wires $f\ f$ are inserted, as shown in Fig. 1. The said wires $f\ f$ are secured in each end of the shaft by passing it through the shaft, as shown in Fig. 1.

$g\ g$ represent the inner layers of tough and strong rubber; and $h\ h$ represent the outer soft layer of rubber.

My improved roll is made as follows: The wire $f\ f$ is attached to one end of the shaft, and passed through the end washer, after which I place the first tough sheet or tube $g$ on the shaft nearest to the end; then a second washer, $c$, is placed on the shaft, and the wires passed through the perforations in said washer, and so on till the last washer is placed on the opposite end of the shaft, when the wires are secured to the shaft. I then commence to build up the outer layer $h$ around the layers $g\ g$, washers $c\ c$, and wires $f\ f$, and when completed the whole of the rubber is placed in a mold and vulcanized in the usual manner, whereby the whole of the rubber is made to form, as it were, one solid piece, with the wires $f\ f$ passing through it from end to end.

It will thus be seen that my rubber is equally and firmly secured to the shaft during its entire length, by which the roll is made more durable and prevented from breaking midway between the ends.

What I wish to secure by Letters Patent, and claim, is—

The grooved shaft $a$, in combination with the washers $c\ c$, having lips or projections $d\ d$ fitting the grooves $b\ b$ in the shaft, and the wires $f\ f$ passing through perforations $e\ e$ in the washers, substantially as and for the purpose set forth.

In testimony that I claim the foregoing as my invention, I have hereunto set my hand this 3d day of April, 1875.

RICHARD W. REXFORD.

Witnesses:
 ALBAN ANDRÉN,
 JOHN R. HEARD.